United States Patent [19]
Zarrin et al.

[11] Patent Number: 5,524,245
[45] Date of Patent: *Jun. 4, 1996

[54] SYSTEM FOR BOOTING COMPUTER FOR OPERATION IN EITHER ONE OF TWO BYTE-ORDER MODES

[75] Inventors: Saeed S. Zarrin, Sunnyvale; Robert Rodriquez, San Jose, both of Calif.

[73] Assignee: Silicon Graphics, Inc., Mountain View, Calif.

[*] Notice: The term of this patent shall not extend beyond the expiration date of Pat. No. 5,408,664.

[21] Appl. No.: 378,844

[22] Filed: Jan. 26, 1995

Related U.S. Application Data

[63] Continuation of Ser. No. 901,910, Jun. 19, 1992, Pat. No. 5,408,664.

[51] Int. Cl.$^6$ .............................. G06F 9/06; G06F 9/44; G06F 9/445
[52] U.S. Cl. ..................... 395/700; 395/500; 395/775; 364/280.2; 364/280.3; 364/282; 364/DIG. 1
[58] Field of Search ................... 395/500, 800, 395/700, 725, 775, 325, 375, DIG. 1, DIG. 2

[56] References Cited

U.S. PATENT DOCUMENTS

| | | | |
|---|---|---|---|
| 4,430,704 | 2/1984 | Page et al. | 364/200 |
| 4,663,707 | 5/1987 | Dawson | 395/700 |
| 4,679,166 | 7/1987 | Berger et al. | 395/650 |
| 4,959,779 | 9/1990 | Weber et al. | 395/775 |
| 4,999,808 | 3/1991 | Biahut et al. | 395/775 |
| 5,022,077 | 6/1991 | Bealkowski et al. | 380/4 |
| 5,136,711 | 8/1992 | Hugard et al. | 395/700 |
| 5,163,145 | 11/1992 | Parks | 395/500 |
| 5,220,654 | 6/1993 | Benson et al. | 395/275 |
| 5,257,368 | 10/1993 | Benson et al. | 395/600 |
| 5,257,380 | 10/1993 | Lang | 395/700 |
| 5,261,104 | 11/1993 | Bertram et al. | 395/700 |
| 5,269,022 | 12/1993 | Shinjo et al. | 395/700 |

OTHER PUBLICATIONS

"Multiplexed Buses: The Endien Waves Continue", David V. James; Apple Computer Jun. 1990, IEEE Micro; p. 9–21.

*Primary Examiner*—Meng-Al An
*Attorney, Agent, or Firm*—Sterne, Kessler, Goldstein & Fox

[57] ABSTRACT

A system for abstracting the byte ordering of a computer firmware from the operating system by allowing a computer to automatically change endianness under full software control. The byte ordering can be switched completely transparent to the end user during system boot. The system is comprised of hardware and software to run either byte order stand alone software or operating systems on demand.

4 Claims, 6 Drawing Sheets

PHASE ZERO FIRMWARE

SYSTEM FOR BOOTING COMPUTER FOR OPERATION IN EITHER ONE OF TWO BYTE-ORDER MODES

This is a Continuation of application Ser. No. 07/901,910, filed Jun. 19, 1992, U.S. Pat. No. 5,408,664.

BACKGROUND OF THE INVENTION

The present invention relates generally to computer systems, and more particularly to techniques for configuring computer systems for different byte orders.

Computer systems fall into two byte-order categories: big-endian and little-endian. Big-endian machines number the bytes in a word from zero to three (or zero to seven for a 64-bit word), with byte zero holding the sign bit and most significant bits. For half words, big-endian machines number the bytes zero and one, with byte zero holding the sign bit and most significant bits. Little-endian machines number the bytes of a word from three to zero. Byte three holds the sign bit and most significant bits. For half words, little-endian machines number the bytes one and zero. Byte one holds the sign bit and most significant bits. The byte order (endianness) of a computer system's CPU, firmware, and I/O system dictates the type of operating system and binary code that can run on that system.

Computer systems are normally manufactured with a particular byte order that cannot be altered by the end user. While manufacturers have designed components such as the CPU and I/O controllers that can be configured to operate in either byte-order mode, firmwave is normally one mode or the other. Thus, the configurable components are normally statically hard-wired by the manufacturers to operate in the same byte order as the computer firmware.

Unfortunately, some industry standard operating systems are big-endian and others are little-endian. While it is in principle possible to recompile and/or rewrite software to change its byte order, the firmware is fixed in ROM with a particular byte order. Thus, despite the reconfigurability of the hardware components, a user who wants to run programs under the Microsoft NT operating system (little-endian) and under the MIPS RISC/OS operating system (big-endian) has to make physical adjustments to the hardware, if possible, or in some cases, buy two machines.

SUMMARY OF THE INVENTION

The present invention abstracts the computer firmware byte order to allow an end user to install big-endian or little-endian byte-ordered software under software control. The system provides the user the ability to effect a firmware update and byte order change at boot time without having to make physical hardware adjustments.

In brief, a system incorporating the invention comprises a first non-volatile memory mapped to a startup address and storing a program, referred to as the base firmware. The base firmware is in the first byte order (little-endian in a specific embodiment). On power-up, the CPU and I/O system default to the first byte order and the CPU executes the base firmware. The system also includes a second non-volatile (but preferably writable) memory storing a program, referred to as the boot firmware, which can be in either byte order. Also stored in the second memory is a signature that specifies the boot firmware's byte order.

The system also includes reconfiguration circuitry that operates in response to instructions in the base firmware to change the hardware byte-order configuration, if required by the boot firmware. However, such changes are only allowed to become effective on the next reset. In particular, the circuitry configures the CPU byte order, if necessary, and remaps memory so that on reset the CPU will assume the byte order specified by the signature in the boot firmware and the CPU will commence executing the boot firmware. In operation, the base firmware controls the reconfiguration circuitry and then resets the system. The I/O system byte order may be configured in the same way as the CPU byte order, or it may be configured under program control by the boot firmware after the reset. In a preferred embodiment, the second memory is writable (e.g. flash EEPROM), and on power-on, the base firmware can prompt the user to select the firmware to be written into the second memory before the CPU instructs the configuration circuitry. Thus, a user wishing to boot up a particular operating system can so specify from the keyboard, and rest assured that the hardware, the firmware, and the software will be marching to the same beat. A further understanding of the nature and advantages of the present invention can be realized by reference to the remaining portions of the specification and the drawings.

DESCRIPTION OF SPECIFIC EMBODIMENTS

Figure 1:
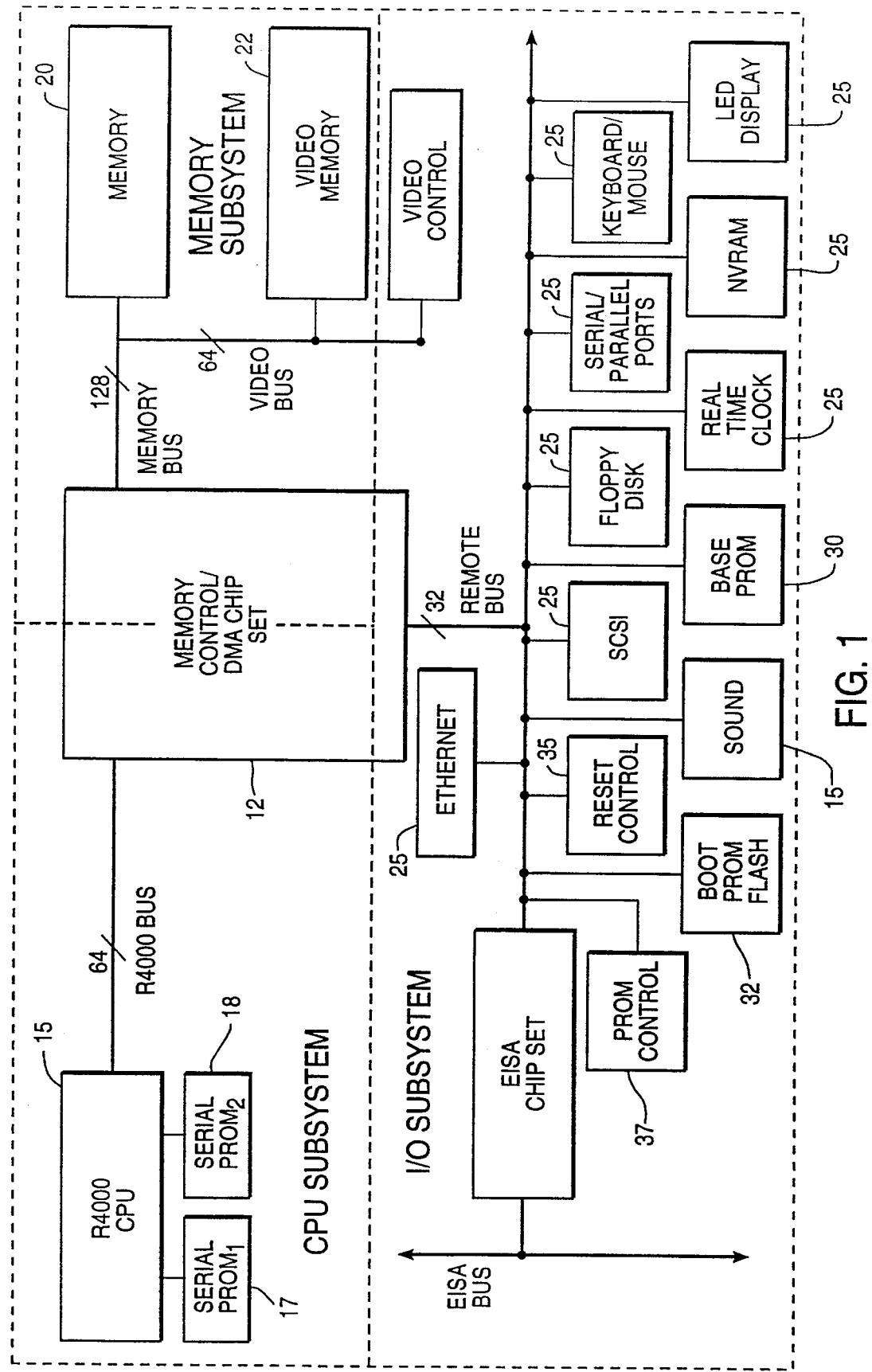
FIG. 1 is a block diagram of a computer system incorporating the present invention.

FIG. 1 is a high-level block diagram of a computer system 10 incorporating the present invention. The system may be considered to include three main portions, a CPU subsystem, a memory subsystem, and an I/O subsystem. A memory control/DMA chip set 12 controls the addressing and the data paths among the subsystems, and includes the following (not shown separately): a processor interface, a memory interface, a video interface, an I/O translation table and cache, an EISA bus interface, an i486 compatible master/slave interface, and eight slave DMA channels.

The CPU subsystem includes a CPU 15, which in a specific embodiment is a MIPS R4000 RISC processor, and first and second serial configuration programmable read-only memories (PROMs) 17 and 18. Each serial PROM stores system interface configuration information, including byte order information for possible communication to the CPU at startup. Serial PROM 17 provides the configuration for big-endian mode, while serial PROM 18 provides the configuration information for little-endian mode. Specific references to big-endian and little-endian are for the purpose of describing a specific embodiment. At any given startup time, only one of the serial PROMS is allowed to communicate information to the CPU. At power-on, the default is that serial PROM 18 is selected so that the processor is initially configured for little-endian mode.

The memory subsystem includes system memory 20 and video memory 22, which are standard as far as the present invention is concerned. The I/O subsystem (which is memory-mapped) includes a number of peripheral controllers and devices 25 which are standard and will not be described. However, of relevance to the present invention are a pair of PROM devices 30 and 32, and certain registers in reset control circuitry 35 and PROM control circuitry 37, as will be described below.

PROM devices 30 and 32 include the system firmware for booting the operating system. In the prior art, there would have been a single device, typically a 128K or 256K system PROM whose instructions provide most of the low-level interaction with the hardware. According to the present invention, as will be discussed below, the boot process occurs in two phases, designated phase zero and phase one, with PROM 30 storing what is referred to as the base or phase zero firmware, and PROM 32 storing what is referred to as the boot firmware or phase one firmware. In the particular embodiment, PROM 30 is a 64K EPROM device whose contents are never changed during operation, and PROM 32 is a 256K flash Electrically Erasable PROM (flash EEPROM) which can be overwritten with alternative firmware instructions. An additional phase, called phase two, refers to operation once the operating system has been loaded and commences execution.

Figure 2:
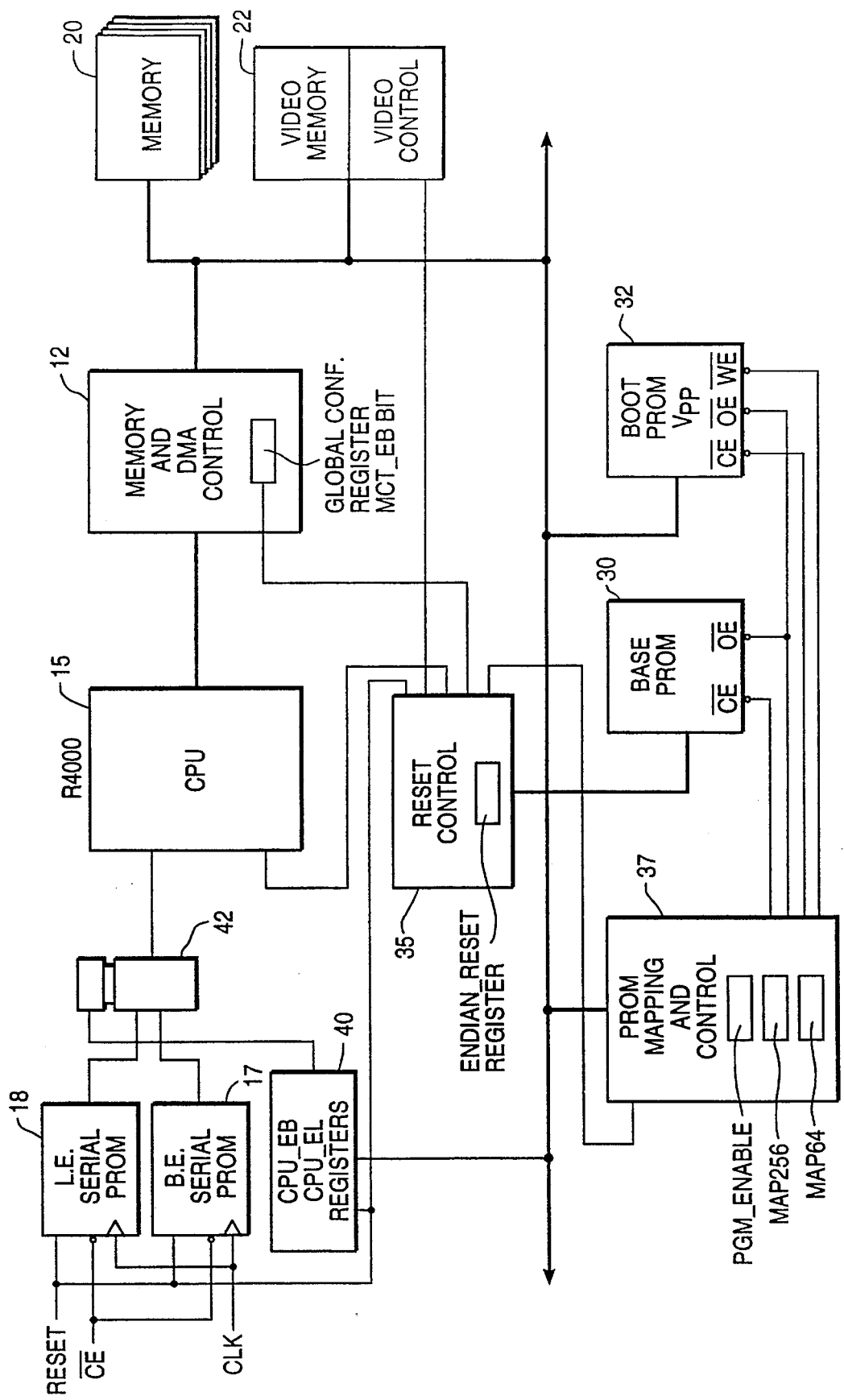
FIG. 2 is an expanded block diagram showing the control registers used in the present invention.

FIG. 2 is an expanded block diagram showing a number of registers used to control the flash EEPROM programming, the byte order after a reset, the base PROM and boot PROM mapping, the memory/DMA byte order, and system cold reset. The actual implementation of the support logic is programmable logic arrays (PLAs).

A serial PROM control circuit 40 includes a pair of registers, designated CPU_EB and CPU_EL, which control a multiplexer 42 to select the data from one or the other of serial PROMs 17 and 18 (which both remain enabled).

The CPU_EB register is endian independent and resides at a double word address of 0×8000D100. Writing any value to this register sets this register to 1 and selects the big-endian serial PROM 17. The CPU_EB register is cleared (set to 0) by writing to the CPU_EL register address, and is set to 0 at Power-On-Reset. It is not affected by any other reset.

The CPU_EL register is endian independent and resides at a double word address of 0×8000D200. Writing any value to this register sets the register to 1 and selects the little-endian serial PROM 18. This register is set to 1 upon Power-On-Reset and is not affected by any other reset.

Reset control circuit 35 includes an ENDIAN_RESET register, which is a cold reset register. Writing any value to this register causes the CPU to read one of the two serial PROMs, depending on the values of the CPU_EB and CPU_EL registers. The ENDIAN-RESET register clears itself during reset. This register has a double-word and endian-independent address of 0×8000D000.

PROM control circuit 37 includes MAP64 and MAP256 registers to control the mapping of PROMs 30 and 32, and a PGM_ENABLE register to control the programming of PROM 32.

The PGM_ENABLE register is a read and write register and it is accessed at 0×8000D500 in little-endian mode and at 0×8000D507 in big-endian mode. It is used by the base firmware to erase and program the boot firmware in flash EEPROM. Setting bit0=1 in this register turns on a 12 V supply to the flash EPROM; other bits are undefined. This bit must be turned on and off by software according to the particular specifications for the flash EPROM device (for example, AM28F020).

The MAP64 register controls the PROM mapping and has a double word endian-independent address of 0×8000D300. Writing any value to this register followed by writing to the ENDIAN_RESET register maps the 64K base PROM to 0×1FC00000 (startup address) and the 256K boot flash EEPROM to 0×1FC40000. The MAP64 register is cleared by writing to the MAP256 register. This register is set to 1 upon Power-On-Reset and is not affected by any other reset.

The MAP256 register also controls the PROM mapping and has a double word and endian-independent address of 0×8000D400. Writing any value to this register followed by writing to the ENDIAN_RESET register maps the 256K flash EPROM to 0×1FC00000 (startup address). The MAP256 register is cleared by writing to the MAP64 register. This register is set to 0 upon Power-On-Reset and is not affected by any other reset.

The MCT_EB bit register is located in Memory and DMA control circuitry 12. When written to, it sets the register to big-endian mode. This register is reset to little-endian mode on power-on and cold reset.

Figure 3A:
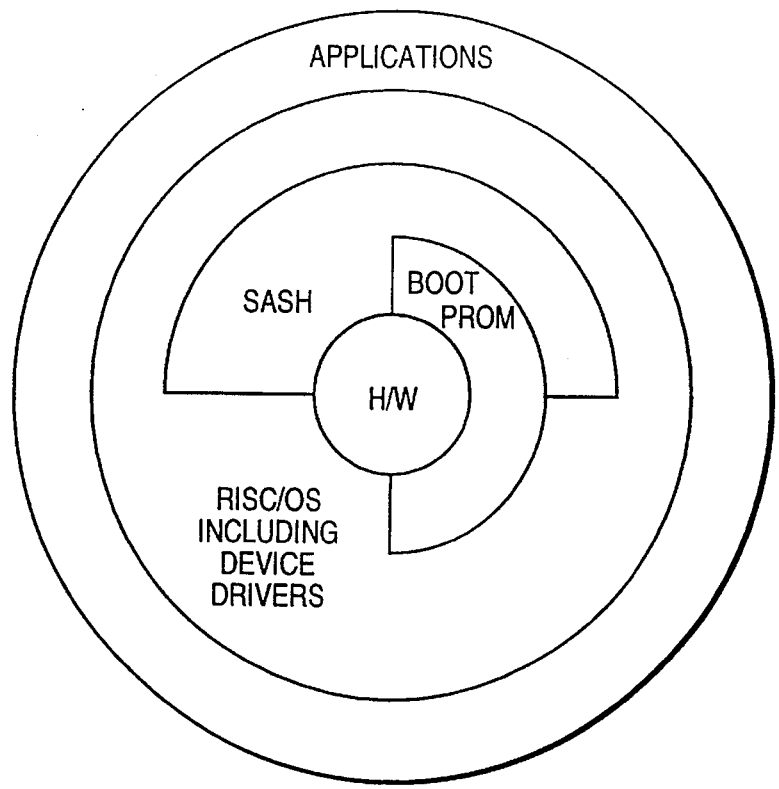
FIGS. 3A and 3B are diagrams illustrating the prior art relationship of hardware, software, and firmware, for two operating systems.
Figure 3B:
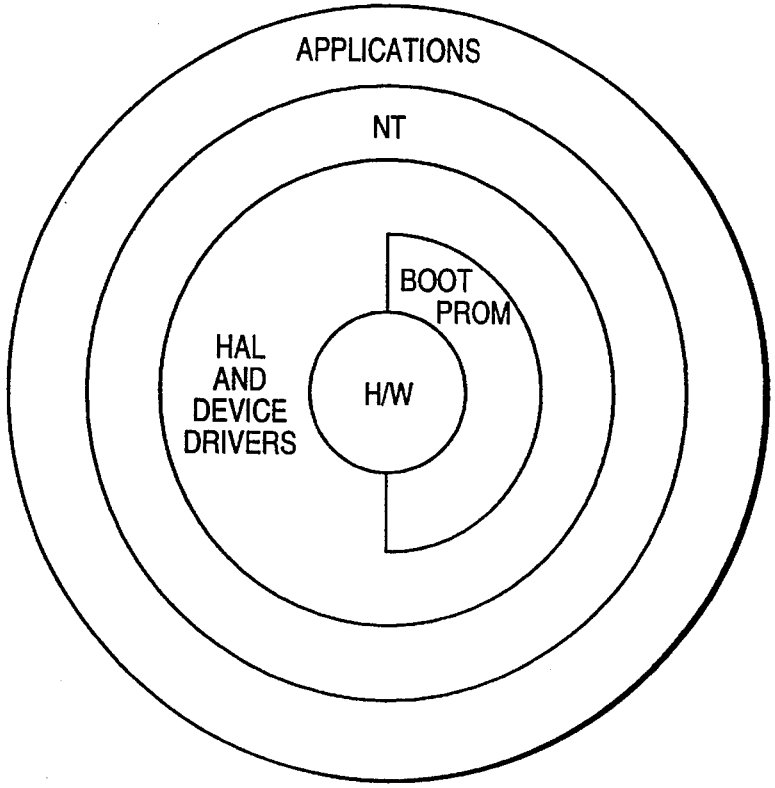

FIGS. 3A and 3B illustrate schematically the relationship of the hardware, firmware, and software in a prior art system that has booted up either the MIPS RISC/OS operating system, which is big-endian, or the Microsoft NT operating system, which is little-endian. In both, the hardware and boot PROM have their standard relationship, and a number of software entities are layered above.

With respect to FIG. 3A, a standalone shell (SASH) interfaces to the PROM and the hardware, and contains routines that supplement those in the PROM to help load the operating system. The MIPS RISC/OS operating system includes linked device drivers so that portions of the operating system are seen as having direct interaction with the hardware. Layered on top of the operating system are application programs that generally do not interface directly to the hardware.

With respect to the Microsoft NT operating system shown in FIG. 3B, the hierarchy is slightly different. A hardware abstraction layer (HAL) and device drivers provide an interface, both to the boot PROM and the hardware, and the NT operating system itself does not interface directly with hardware. Again, in accordance with known practice, the application programs interface to the operating system.

Figure 4:
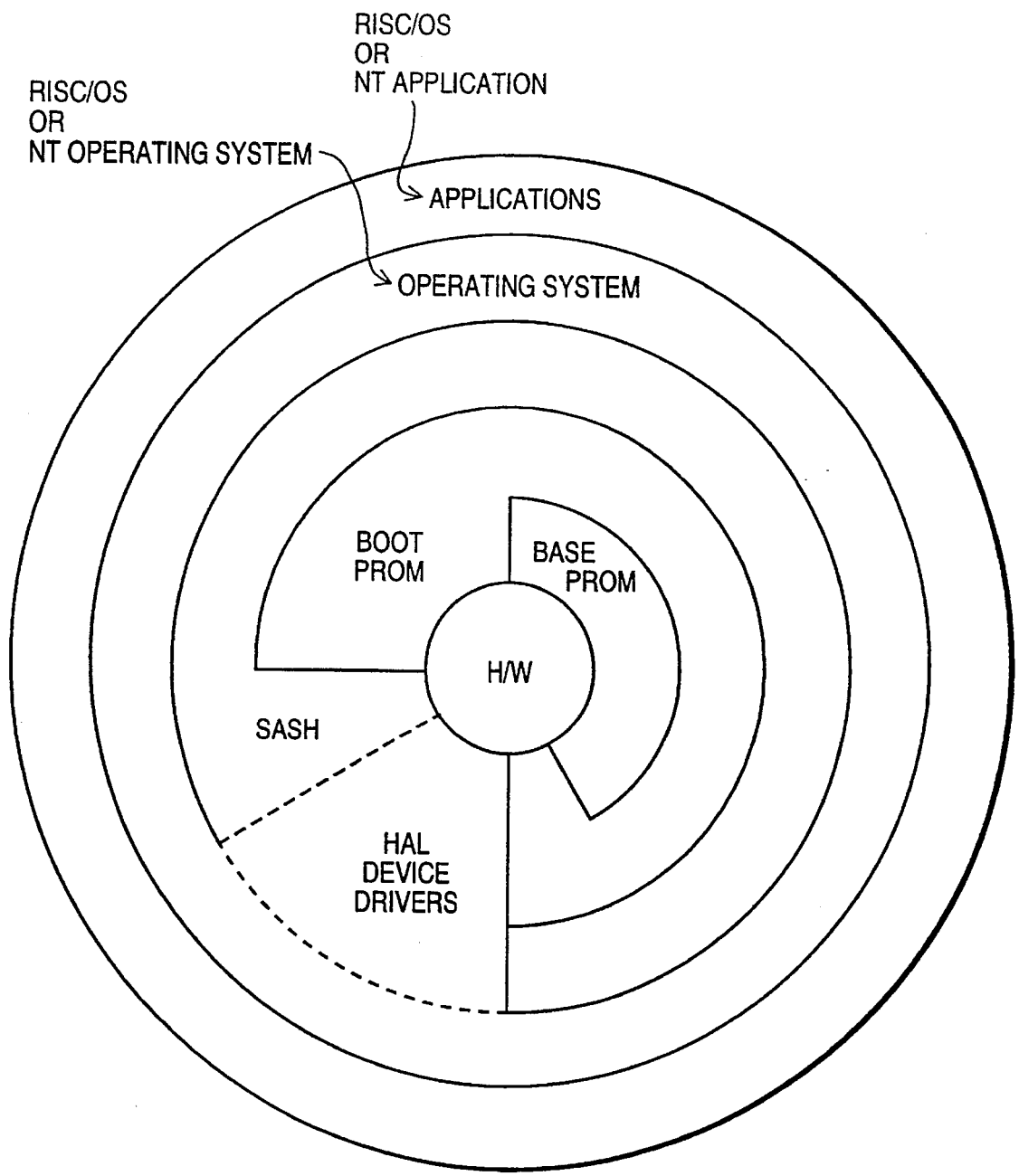
FIG. 4 shows the relationship according to the present invention.

FIG. 4 shows a corresponding diagram for the present invention. The primary difference at this level is that booting occurs in two phases, with the base firmware stored in base PROM 30 and the boot firmware stored in boot PROM 32. Both these have direct interface to the hardware. Additional portions of the software interface to the firmware and hardware are as discussed above.

Figure 5A:
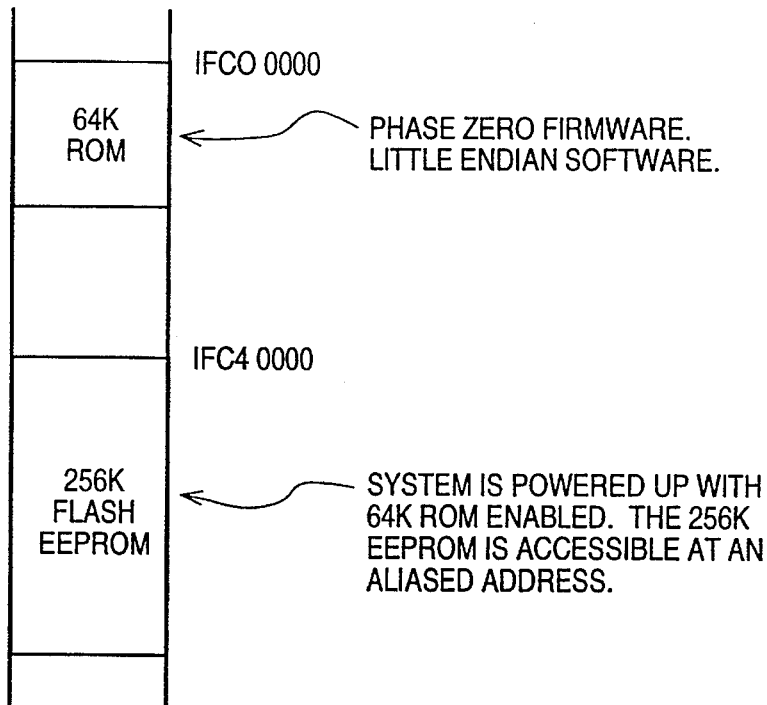
FIGS. 5A and 5B are memory maps illustrating the remapping between/phase zero and phase one of the boot process.

The system boot occurs in phases, including phase zero or "configuration phase" and phase one or "boot phase." The phase zero firmware resides in PROM 30 and the phase one firmware resides in flash EEPROM 32. FIG. 5A is a partial memory map for phase zero. The system is powered on in phase zero, in which phase, the CPU and I/O sub-system are configured to operate in little-endian mode. In phase zero, PROM 30 is enabled and mapped to the startup address (0×1FC00000 in the particular embodiment). Flash EEPROM 32 is accessible at an address (0×1FC40000) offset from the startup address. All software routines in PROM 30 (phase zero firmware) are compiled or assembled to operate in little-endian mode. The phase zero firmware contains the necessary code to handle exceptions, load and execute programs from a floppy disk, control the CPU and I/O byte-order registers, and reset the entire system through a software command. In addition, the phase zero firmware can access and update the contents of flash EEPROM 25, which contains the phase one firmware and is accessible through an aliased address in phase zero.

Figure 5B:
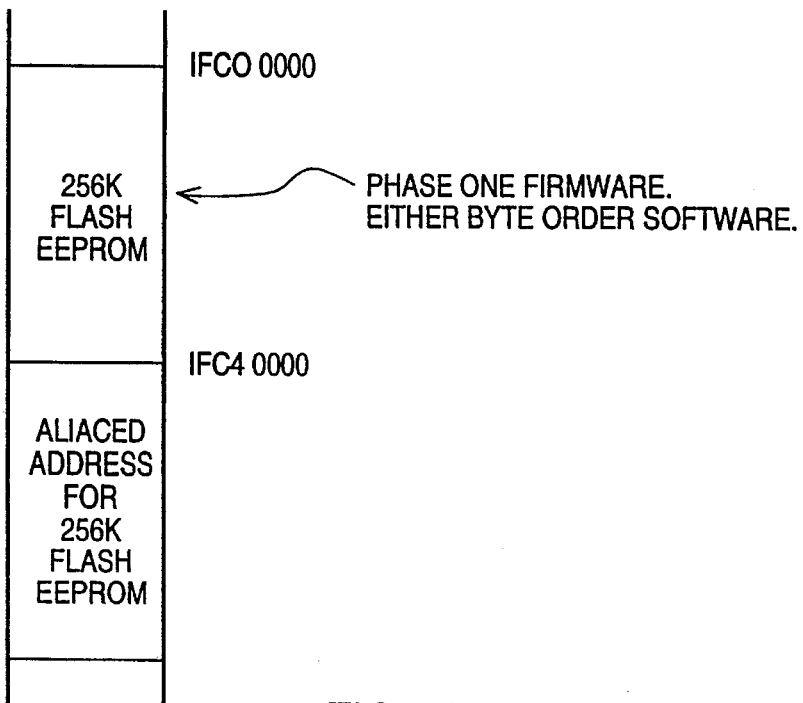

FIG. 5B is a partial memory map for phase one. As will be described below, in phase one, the flash EEPROM is mapped to the startup address so that exceptions and interrupts are vectored to the proper routines in phases zero and one.

Figure 6:
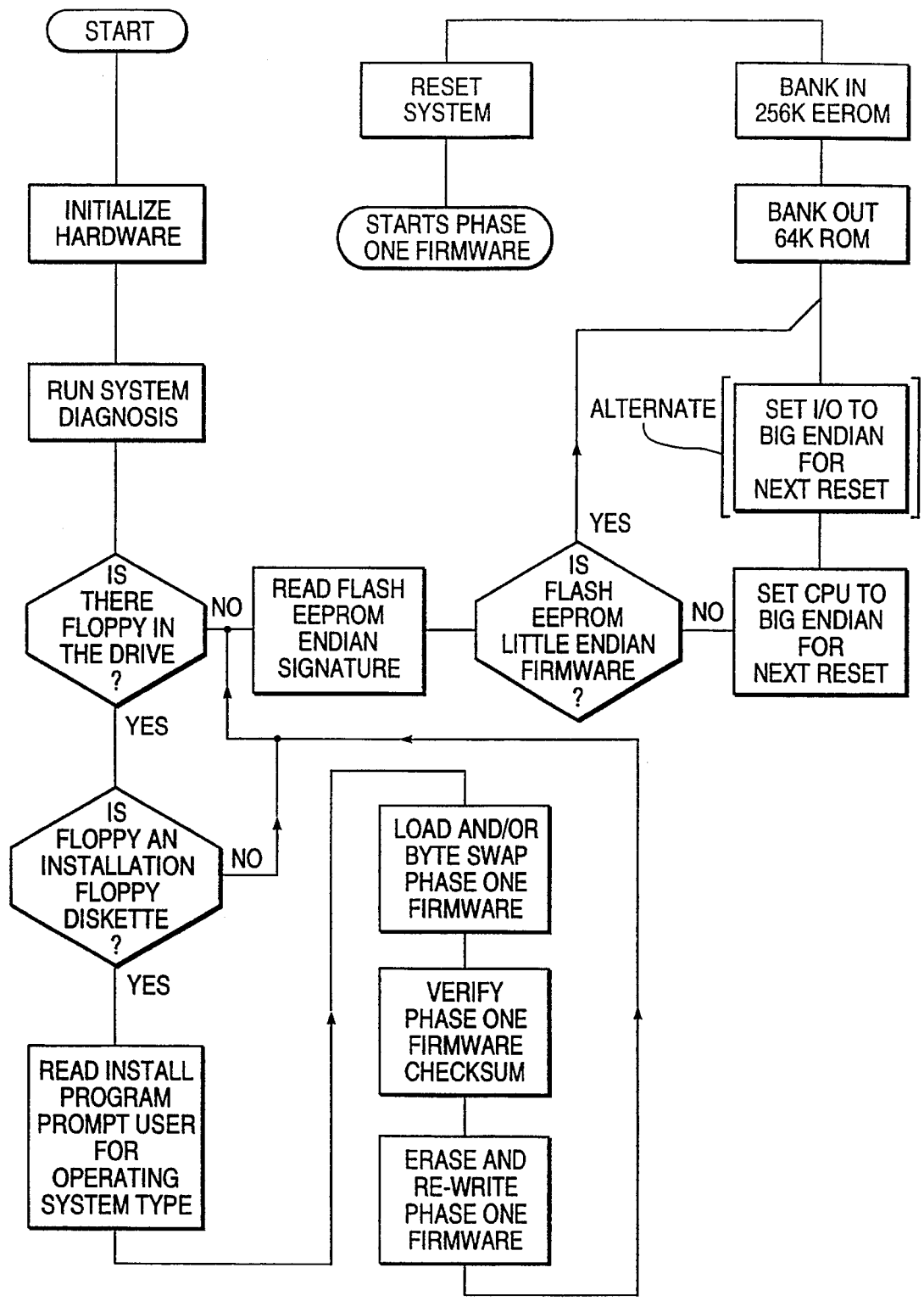
FIG. 6 is a flow chart illustrating the phase zero firmware.

FIG. 6 is a flow diagram of the phase zero firmware. The phase zero firmware initializes the hardware, runs basic system diagnostics such as a memory test, and checks for the presence of an "installation diskette" in the floppy drive at power-on time. If such diskette is not found, it determines the byte order of the flash EEPROM by reading its signature. It then ensures that the system CPU will, after reset, be configured for the same byte order specified by the flash EEPROM signature. This includes writing to the CPU_EB register if big-endian is specified so as to select the appropriate serial PROM after reset. The phase zero firmware can interact with the reset circuit and generate a reset sequence which forces the system into the "boot phase" with the CPU set to the proper byte order.

If an "installation floppy diskette" is found in the disk drive, the phase zero firmware will attempt to read and execute a "boot control" program in little-endian mode on the floppy disk. The interactive "boot control" program prompts the user at installation time to determine which operating system is being installed. This program then reads the proper firmware file from the installation diskette (or network), byte swaps the object, erases and updates the flash EEPROM according to the byte order of the designated operating system.

At this point, the program executes from where it would have had there been no installation floppy disk in the drive. After the CPU has been set to be reconfigured on reset, if necessary, to operate in the byte order specified by the signature, the memory mapping circuitry is set so that on reset, flash EEPROM 25 will be mapped to the startup address. This is accomplished by writing to the MAP256 register. The program then initiates a system reset sequence which starts the boot phase. On reset, the CPU receives the configuration information from the selected serial PROM and begins executing the boot firmware in the flash EEPROM. This EEPROM contains the conventional firmware functions that are used to boot an operating system, and the operation phase begins once the boot firmware transfers control to the loaded operating system.

The flow diagram shows the step of setting the CPU to big-endian followed by the step (in brackets) of setting the I/O to big-endian for the next reset. This is the preferred technique for setting the I/O byte order. However, in the particular implementation described above, the MCT_EB bit is set to little-endian on both kinds of reset. Accordingly, setting this bit to big-endian, if necessary, is performed after reset by the boot firmware.

In conclusion, it can be seen that the present invention provides an elegant solution to the problem of byte-order incompatibility. A phased boot approach for swapping byte order provides a mechanism for changing a computer firmware byte order through software control without power-cycling. The technique abstracts the underlying byte order orientation of CPU, firmware, and I/O system from the operating system through automatic reconfiguration of CPU, firmware, and I/O. Thus, the computer can execute software generated for either byte order.

While the above is a complete description of the preferred embodiments of the present invention, various modifications, alternative constructions, and equivalents can be used. Therefore, the above description and illustration should not be taken as limiting the scope of the invention which is defined by the claims.

What is claimed is:

1. A method of booting a computer system for operation in a selected one of first and second byte-order modes, the first byte-order mode for processing data characterized by a first byte order, the second byte-order mode for processing data characterized by a second byte order, comprising the steps of:

providing a CPU that is configurable for operation in either of the first and second byte-order modes;

providing a first program, stored in a first non-volatile memory, characterized by the first byte order;

providing a second program, stored in a second non-volatile memory, operable to boot an operating system;

configuring the CPU for operation in the first byte-order mode at power on;

executing the first program at power-on, including the steps of determining the byte-order mode characterized by a signature in the second program, writing to an appropriate CPU register to enable a corresponding serial PROM after reset, setting a memory mapping circuit to map the second non-volatile memory to a startup address on reset; and initiating a reset; and on reset, configuring the CPU for operation in the byte-order mode specified by the signature in the second program, and commencing execution of the second program.

2. The method of claim 1, and further comprising the steps of:

mapping the first program to a startup address at power-on and during the execution of the first program; and mapping the second program to said startup address on reset.

3. The method of claim 1, and further comprising the steps of:

providing an I/O system that is configurable for operation in either of the first and second byte-order modes; and configuring the I/O system in the first byte-order mode at power-on; and as part of executing the second program, configuring the I/O system for operation in the byte-order mode corresponding to the byte order determined in said determining substep.

4. The method of claim 1, and further comprising the substeps, performed as part of executing the first program, of:

determining whether a user-installable storage medium having a third program is installed;

if and only if such a storage medium is installed, prompting the user to specify whether said third program is to be substituted for said second program; and if and only if the user specifies that said third program is to be substituted for said second program, overwriting said second program with said third program.

* * * * *